Patented July 15, 1941

2,249,312

UNITED STATES PATENT OFFICE 2,249,312

REACTION PRODUCTS OF SULPHUR CHLORIDE WITH OLEFINS AND PROCESSES FOR PRODUCING THE SAME

Richard H. Kimball, Lewiston, N. Y., assignor to Hooker Electrochemical Company, Niagara Falls, N. Y., a corporation of New York No Drawing. Application May 22, 1940, Serial No. 336,633

26 Claims. (Cl. 260—139)

My invention relates more particularly to stable, liquid reaction products of sulphur chloride with such olefins as, for example, di-isobutylene, amylene, tetracosylene and cyclohexene.

The reaction of sulphur chloride with hydrocarbons, such as mineral lubricating oils and gaseous olefins, is of course well known. For example, cutting oils are produced by treating mineral oils with sulphur chloride. They are corrosive to metals. The extremely irritating and corrosive product known as "mustard gas" is produced by bubbling gaseous olefins through sulphur monochloride. In general the reaction products of sulphur chloride with olefins are yellowish, fuming, unstable, corrosive liquids. However, the reaction of sulphur chloride with isobutylene polymers under polymerizing conditions, to produce a rubber-like solid, is known and has been disclosed by Standard Oil Development Company in the Chemical Trade Journal for December 11, 1936. My product is neither an unstable corrosive liquid nor a rubber-like solid but a relatively non-volatile, bland, stable, noncorrosive, reddish colored liquid of medium viscosity, containing a substantial proportion of sulphur and also a greater or less proportion of chlorine. It is miscible with mineral lubricating oils and oil-like chlorparaffins and useful as an addition agent for increasing the film-strength or load-carrying capacity of such lubricants, and for other purposes.

In the preparation of my new product from di-isobutylene, for example, I first react the di-isobutylene with sulphur chloride, producing an unstable, corrosive, crude product of the type that is characteristic of such reactions. For this purpose I may use either sulphur monochloride or sulphur dichloride. Preferably, I react the sulphur chloride with an equal weight or slight excess of di-isobutylene, at 75° to 100° C. Hydrochloric acid is evolved freely, indicating a substitution of chlorine for hydrogen. If the reaction is with sulphur monochloride, it is started by preheating to about 80° C., or somewhat less if iron be present. It is slightly exothermic and soon becomes self-sustaining. The reaction with sulphur dichloride is still more exothermic. It starts readily at 45° C., without addition of catalysts. In either case a large proportion of the sulphur (90–100%) enters into the composition, but only a minor proportion of the chlorine (30–40%). This is directly contrary to what happens when gaseous olefins are bubbled through sulphur monochloride, as in the prior art, in which case most of the chlorine enters into the composition, but only half the sulphur, the remaining sulphur going into solution. This may be due to the fact that I add the sulphur chloride to the olefin instead of adding the olefin to the sulphur chloride, as in the prior art.

When made under optimum conditions, the crude product of the first reaction contains no sulphur chloride; nevertheless it is a vicious, fuming, unstable, corrosive liquid. It cannot be crystallized or distilled without decomposition, even under vacuum. However, I have discovered that when treated with an alkali or compound having an alkaline reaction, such as lime, caustic soda, or sodium sulphide, etc., it reacts to form an entirely new, relatively stable, and non-corrosive product. I therefore treat it with an aqueous solution of such a stabilizing agent, at about 80° to 90° C., with stirring, for several hours. A rise in temperature indicates an exothermic reaction. At the end of the reaction the aqueous phase is run off. The product may be dried and used without further treatment, or it may be diluted with a solvent such as benzene or toluene, washed with hot water and vacuum dried, with recovery of the solvent. The finished product is found to contain 21% to 35% of sulphur and 1.5 to 12.1% of chlorine. Since in the low range this chlorine content is less than would correspond to one atom per molecule, it is evident that a large proportion of the molecules may be chlorine-free. Also, as I shall show later, during the treatment with sodium sulphide, sulphur is not added, but on the contrary, some of the sulphur is removed. Very similar results are obtained whether the agent be sodium sulphide or caustic soda; in fact, I prefer to use a mixture of the two. By treating the product in successive steps, it can be proven that the reaction grows less and less and finally nearly ceases. I interpret these observed facts as indicating that the product tends toward a fairly definite form, which is characteristic for the particular stabilizing agent used, provided there is a sufficiency or excess of the stabilizing agent. At present I do not know the exact composition of my product. Although it is probably a mixture, it cannot be fractionated. It is nevertheless quite evidently a new product having properties differing markedly from those of any hitherto known composition and which have been found to render it highly desirable for use in lubricants, as hereinbefore stated.

The use of alkalies to neutralize acidity in acid products of organic reactions is, of course, old practice. However, in this case the fundamental reaction is evidently an addition of sulphur monochloride or sulphur dichloride to the ethylenic linkage of the olefin. This may be accompanied by an elimination of hydrochloric acid, which may continue long after the addition of the sulphur chloride is completed. The alkali used in the subsequent treatment does far more than neutralize free acidity, which is accomplished by only a small fraction of the amount actually consumed. Rather the treatment with alkaline reagents extracts both sulphur and chlorine from chemical combination in the molecule, and since the sulphur and chlorine atoms first extracted would naturally be those that were the more loosely held, the effect might be expected to be an increase in stability, and this is exactly what happens. Nevertheless I do not wish to be held to this or any particular theory, as there may also be a rearrangement of the molecule.

In the following examples it is to be understood that each sample of product was subjected to the following test for the activity of the sulphur, which I shall refer to hereinafter as the "sulphur test." To a body of "150 vis Penna. neutral oil," enough of the product is added to bring the sulphur content of the oil up to 0.45%. A bright copper rod is then immersed for about half its length in this oil, while maintaining the oil at 100° C., for one hour. A slight or no discoloration of the copper is considered a satisfactory test for a product to be used as an addition agent for automobile lubrication, provided the product develops no material HCl acidity upon standing. Any considerable evolution of HCl, of course, renders the product unfit for the purpose mentioned.

*Example I.*—To 200 grams of di-isobutylene twice its weight of technical sulphur dichloride was added, with stirring, over a period of two hours, during which time the temperature was kept below 50° C. by cooling. The temperature was raised and held at 60° C. for one hour. The product then weighed 515 grams. It was evaporated under vacuum on a steam bath until nothing further would distill over. The residual product then weighed 352 grams and a considerable quantity of sulphur chloride was collected in the receiver. It was a very bad fuming liquid, losing HCl freely. Upon analysis it was found to contain 17.7% sulphur and 31.0% chlorine.

This example is given to show that a large excess of sulphur dichloride, such as the proportion of 2 to 1, is undesirable.

*Example II.*—To 200 grams of di-isobutylene an equal weight of sulphur dichloride was added with stirring, over a period of one hour, during which time the temperature was kept below 90° C. by cooling. HCl was evolved. The temperature was continued at 90° to 95° C. for a further period of three and one-half hours, during which time evolution of HCl continued at a diminishing rate. The product was evacuated on a steam bath 45 minutes. 6½ grams of liquid were condensed in the receiver. The odor of this suggested di-isobutylene. There was no odor of sulphur chloride. The product was filtered and about 10 grams of sandy solid removed. The filtrate weighed 273½ grams. It was a clear, dark red, fuming liquid containing 18.4% sulphur and 14.4% chlorine.

This example shows that when the reagents are in the proportion of about 1 to 1, substantially no sulphur dichloride remains unreacted.

*Example III.*—One kilogram of di-isobutylene was heated to 45° C. in a glass reactor and an equal weight of sulphur dichloride added slowly over a period of about 50 minutes, with stirring, during which time the temperature was kept below 55° C. by cooling. HCl was evolved vigorously. The temperature was then raised and held at 80° C. to 90° C. for one-half hour. The product was air-blown for 15 minutes. It was a dark orange-red liquid and fumed rather badly. Upon analysis it was found to contain 20.5% sulphur and 21.1% chlorine.

This is given as an example of what I at present consider good practice, when using sulphur dichloride.

*Example IV.*—To 200 grams of di-isobutylene a small quantity of technical sulphur monochloride was added at room temperature. There was no evidence of reaction. The temperature was raised to 50° C., whereupon there was a sudden color change and evidence of moderate reaction. The addition was continued with agitation until a total of 200 grams had been added, over a period of 45 minutes, the temperature being gradually raised to 100° C. by heating. HCl was evolved and this continued with diminishing vigor during a further period of 15 minutes, during which the temperature was maintained at 90° to 100° C. The crude product weighed 333½ grams. It was evacuated in a steam bath for one hour, until no more volatile material distilled over. The batch lost 16 grams in weight and a few c. c. of nearly colorless liquid collected in the receiver. This had no odor of sulphur chloride and was not decomposed by water. The product was filtered. It was a dark red liquid with a slight odor of di-isobutylene but no odor of sulphur chloride or mercaptans. It contained 29.0% sulphur and 12.9% chlorine, representing 93% of the sulphur and 41% of the chlorine added in the original sulphur monochloride. Upon standing over night, the presence of a small amount of HCl was apparent. After several days the product fumed badly. This example shows that the reaction of di-isobutylene with sulphur monochloride does not start readily at ordinary temperatures; also that when the reagents are in the proportion of 1 to 1, the product contains little or no free sulphur monochloride.

*Example V.*—200 grams of di-isobutylene was heated to 80° to 90° C. and 200 grams of sulphur monochloride added to it over a period of 2 hours at that temperature. There was a vigorous evolution of HCl. Another 100 grams were added at 100° C. There was a very troublesome foaming. Another 100 grams were added at 110° C., with the same difficulty, many hours being required for the operation. The temperature was held at 110° C. for 1 hour, during which time a considerable amount of yellow crystalline solid appeared. The product was evacuated on a steam bath, with no notable distillation, but the crystalline solids increased until they occupied about ½ of the vessel. The crystals were removed by filtration and found to be soluble in hot methanol, benzene, or toluene, showing that they were not elemental sulphur. The filtrate was black fuming liquid.

This example is given in order to show that with a ratio of sulphur monochloride to di-isobutylene as high as 2 to 1, the results are very unsatisfactory.

*Example VI.*—1,060 grams of di-isobutylene were heated to 80° C. and an equal weight of sulphur monochloride was added, with stirring, over a period of 2 hours, during which time the temperature was held between 80° C. and 100° C. There was no apparent reaction until between 50 and 100 c. c. had been added. The evolution of HCl then started and became too vigorous for easy control, indicating the need of a suitable catalyst to overcome this initial lag. After the addition was completed, the temperature was held for about 30 minutes at 95° to 100° C. The product was air-blown for 15 minutes. It was an orange colored liquid which fumed disagreeably. It was found to amount to 1,732 grams and to contain 28.1% sulphur and 13.5% chlorine, representing 92% of the sulphur and 44% of the chlorine added as sulphur monochloride.

*Example VII.*—300 grams of di-isobutylene were heated to 75° C. in glass and 300 grams of sulphur monochloride added with stirring over a period of 2 hours. The reagents were contacted with iron until the reaction was well under way, as shown by vigorous evolution of HCl, when the iron was withdrawn. During the reaction the temperature was allowed to go up to 85° C. When the sulphur monochloride had been all added, the reagents were held at 85° C. for one and one-half hours while continuing the stirring. The product was amber colored and fumed unpleasantly.

This example shows the catalytic effect of iron in this reaction and represents what I at present consider good practice.

*Example VIII.*—A sample of the product of Example I was diluted with an equal volume of benzene and washed four times with water at 60° C. The benzene was distilled off and the product blown with air. It was found that the sulphur content had gone up from 17.7 to 20.6% and chlorine down from 31.0 to 24.2%. The water contained both HCl and soluble sulphur compounds. The apparent increase in sulphur was therefore only relative and due to washing out of chlorine. The resulting product darkened a copper rod considerably, in the sulphur test and developed much HCl on standing.

This example is presented in order to show that a water wash alone does not give a satisfactory result.

*Example IX.*—55 grams of the product of Example II were diluted to 100 c. c. with benzene. 250 c. c. of 2% NaOH solution were added. The mixture was refluxed with stirring for 2 hours. The product was separated, washed with hot water and vacuum dried on a steam bath. It was found that 2.15 grams NaOH had been used up. The product was a red oil and weighed 42 grams. It was found that the sulphur percent had been increased from 18.4 to 22.9 and the chlorine percent decreased from 14.4 to 12.1 percent. The sulphur test was satisfactory, but upon standing some HCl was given off.

*Example X.*—To 200 grams of the product of Example III was added a solution of 10 grams NaOH in 50 c. c. of water, with stirring. This was followed immediately by addition of a solution of 60 grams of 60 percent flaked sodium sulphide in 100 c. c. of water and 30 grams of powdered calcium hydroxide, likewise with stirring. The reagents were heated and held at 98° C. for 2 hours with agitation. One half of the non-aqueous phase was filtered, with suction. Approximately an equal volume of benzene was added and the solution washed several times with warm water, until the washings were neutral and practically free of inorganic sulphides. The product was then freed from benzene and water by vacuum drying. It was found that the sulphur percent had been increased from 20.5 to 24.6 and the chlorine reduced from 21.1 to 8.6. The sulphur test was satisfactory. The liberation of HCl was slight.

*Example XI.*—After removal of the first half of the non-aqueous phase of Example X, the process was continued with heating and stirring for an additional 3 hours. The resulting product was treated as before. It was found to have general properties very similar to those of the first portion, except that the sulphur percent had been further increased to 28.5 and the chlorine reduced to 5.9. A total of 135 grams of product resulted. At the end of the reaction 22 grams of calcium hydroxide remained unreacted. The sulphur test was again satisfactory. Less HCl was given off upon standing.

*Example XII.*—A 450 gram sample of product made in accordance with Example IV containing 29.8% sulphur and 12.0% chlorine was diluted with 500 c. c. of benzene and stirred at the boiling point of benzene with three successive portions of water for a considerable period. The non-aqueous phase was divided into 3 parts.

The first third was freed of benzene and water. It was a clear reddish oil containing 31.7% sulphur and 11.3% chlorine. It was fairly free of HCl, but after standing several weeks had broken down and was fuming badly.

The second third was further treated in the same way with hot water containing 5% sodium carbonate followed by a final wash with water alone. The product contained 32.5% sulphur and 11.0% chlorine. After standing it fumed badly.

The final third was further treated in the same way with hot water containing 2% of caustic soda followed by a final wash with water alone. The product contained 31.2% sulphur and 10.7% chlorine. As in the two previous cases, upon standing it fumed badly. The sulphur test was unsatisfactory.

These tests show that treatment of the crude product with water alone changes the composition very little and yields an inferior if not entirely unsatisfactory result, at least for use in lubricating oils, and a treatment with weak alkaline solution gives a result that is not much better.

*Example XIII.*—The three products resulting from Example XII were recombined. The mixture contained 31.8% sulphur and 11.0% chlorine. 100 grams of this mixture were stirred at about 95° C. with 100 c. c. of 25% NaOH solution for 6 hours. The non-aqueous layer was diluted with 150 c. c. of benzene and washed four times with water. The product was vacuum dried on a steam bath. It yielded 62.5 grams of a clear red oil having a sulphur content of 23.8% and a chlorine content of 2.4%. The sulphur test was satisfactory.

*Example XIV.*—To another 100 grams of the mixture of Example XIII 10 c. c. of 10% sodium hydroxide were added with stirring and found to neutralize the acidity of the solution. 250 c. c. of solution containing 104 grams of 60% sodium monosulphide were added immediately. The mixture was heated and maintained at 95° C. for 6 hours with agitation. The non-aqueous layer was treated as in the previous example. It weighed 62 grams and contained 23.6% of sulphur, and 4.4% of chlorine. The sulphur test was again satisfactory.

*Example XV.*—To another 100 grams of the mixture of Example XIII were added 10 c. c. of 10% NaOH solution, neutralizing the free HCl. This was immediately followed by 255 c. c. of solution containing 104 grams of 60% sodium monosulphide, and 25.5 grams of sulphur, equivalent to a 25% solution of sodium disulphide. The mixture was treated as in Example XIV. The product weighed 66.5 grams and contained 24.0% sulphur and 4.0% chlorine. Again the sulphur test was satisfactory.

The drastic treatment of the mixture of Example XIII with three very different reagents, as described in Examples XIII, XIV and XV, therefore resulted in very similar products, the sulphur being reduced in each case from 31.8 to about 23.8% and the chlorine from 11 to about 3.6%. Since the treatment of Example XIII with sodium hydroxide could not possibly have introduced sulphur, and since this treatment nevertheless yielded substantially the same product as the treatments with sodium sulphide and disulphide of Examples XIV and XV, it follows that the later treatments likewise could have introduced no sulphur. This is further proven by the fact that there was more sulphur in the aqueous phase after the reaction than before it.

*Example XVI.*—To 100 grams of the product of Example VI were added 120 c. c. of water and 30 grams of solid powdered calcium hydroxide, with stirring, followed immediately by 32 c. c. of a 25% solution of sodium monosulphide (containing 13.3 grams of 60% flake sodium sulphide). This mixture was held at 94° C. with stirring for two and a half hours. One half of the non-aqueous phase was taken off, diluted with an equal volume of benzene, and filtered under suction. It was washed with warm water until the washings were neutral and free from inorganic chloride and sulphide. The product was then freed from benzene and water. It weighed 32.5 grams and contained 34.3% sulphur and 2.0% chlorine. The sulphur test was satisfactory.

*Example XVII.*—The residual reagents of Example XVI were stirred at the same temperature for a further period of two and a half hours, at the expiration of which time there was still an excess of lime. The product was then treated exactly as in Example XVI. The final product weighed 35 grams and contained 34.9% sulphur and 1.6% chlorine. The sulphur test was again satisfactory.

It is to be noted that the original 100 grams of Example XVI contained a total of 28.1 grams of sulphur, whereas the final products of Example XVI and XVII together contained a total of only 23.3 grams of sulphur, showing again that although the sulphur content percent was increased by this treatment, the actual sulphur content was reduced.

It should also be noted that the second treatment for an equal period to which the product was subjected in Example XVII had very little effect on its sulphur and chlorine content, showing that, whatever the effect of the stabilization treatment, it was substantially completed during the first 2½ hours.

*Example XVIII.*—To another 150 grams of the product of Example VI was added a solution containing 20 grams of flake sodium hydroxide, 20 grams of 60% sodium monosulphide and 100 c. c. of water. The mixture was stirred for 2 hours at approximately 93° C. The non-aqueous layer was treated as in Examples XVI and XVII. The product weighed 113 grams and contained 27.3% sulphur and 5.7% chlorine. It gave a satisfactory sulphur test.

*Example XIX.*—500 grams of product made as in Example VI and containing 29.0% of sulphur and 15.0% of chlorine were treated with a proportional amount of the same reagent as in the Example XVIII. The product was heated and stirred at the same temperature for one hour and a sample taken out and finished. It contained 26.8% sulphur and 7.0% chlorine. Heating and stirring of the remainder was continued for a second hour. The finished product contained 26.7% sulphur and 6.2% chlorine, and the sulphur test was satisfactory. The total product weighed 369 grams.

Examples XVIII and XIX show that treatment of a given crude sulphurized di-isobutylene with sodium hydroxide and sodium monosulphide yields a product containing less sulphur and more chlorine than treatment of the same crude material with lime and sodium monosulphide; they also show that in the alkali treatment of sulphurized olefins a point is reached beyond which further treatment with the same reagent has very little effect.

*Example XX.*—300 grams of di-isobutylene were reacted with 300 grams of sulphur monochloride as in Example VII. The product was treated first with a solution originally consisting of 64 grams of sodium hydroxide and 64 grams of 60% sodium monosulphide in 320 c. c. of water, but which had already been used to finish the treatment of a previous similar batch, for 2 hours at 90° to 95° C. with stirring. The aqueous layer was removed and the same product treated with a fresh solution of the same composition for one hour at the same temperature with stirring. The aqueous layer was preserved for preliminary treatment of the next succeeding batch. The product was agitated with 10 grams of "filteraid" and filtered under suction. The filtrate was vacuum dried without washing and was found to be practically free from the aqueous phase. The product weighed 336 grams and contained 28.5% of sulphur and 4.5% of chlorine. It was satisfactory under the sulphur test and entirely suitable for use as an addition agent for lubricants.

This is an example illustrating what I at present consider my best practice.

*Example XXI.*—Examples X and XI were repeated, with the addition of 50 c. c. of methanol to the solution of sodium sulphide. The resulting product had substantially the same composition and properties.

To recapitulate:

The foregoing examples show that:

(a) Di-isobutylene reacts with sulphur monochloride and dichloride at 45° to 100° C. at atmospheric pressure, with evolution of HCl to produce an unstable liquid product which fumes, giving off more HCl.

(b) Sulphur monochloride when reacted with di-isobutylene yields a product having in general a higher sulphur and lower chlorine content than that produced by sulphur dichloride.

(c) The optimum proportions for the reaction of sulphur monochloride or dichloride with di-isobutylene are substantially equal weights.

(d) Excess of sulphur monochloride beyond the 1 to 1 ratio tends to cause foaming.

(e) When sulphur monochloride is one of the reagents, preheating to about 80° C. is desirable; also contact with iron until the reaction is well under way, but the iron should then be withdrawn.

(f) A wash with water or weak alkaline solution does not appreciably change the characteristics of the product.

(g) When reacted with a strong solution of an alkali or compound having an alkaline reaction and capable of forming relatively stable compounds with sulphur and chlorine, sulphur and chlorine are removed from the molecule.

(h) The product is thereby rendered more stable and less corrosive to metals.

(i) Caustic alkalis and alkali metal sulphides and carbonates are suitable for this purpose.

(j) Mixtures of caustic alkalis and alkaline sulphides are more effective than either alone.

The reaction of the crude product with any given stabilizing agent tends to go substantially to an end point, resulting in a product the composition and physical characteristics of which depend upon the particular stabilizing agent used. After that further treatment with the same stabilizing agent has very little effect.

*Example XXII.*—To 175 grams (2.5 mols) of technical amylene, an equal weight of sulphur monochloride was slowly added with stirring over 1½ hours. The reaction did not start until about 16 grams of sulphur monochloride had been added and the reagents had been held at 38° C. for 20 minutes. The temperature rose slowly to 52° C. during the remainder of the addition. Unlike the reactions of the previous examples, very little HCl was given off during the reaction. The product was a clear brownish yellow oil. It was raised to 95°–98° C. and held at that temperature for an hour during which time it darkened in color. The product at this point weighed 349 grams. It was again heated under vacuum on the steam bath for ½ hour losing only 5 grams in weight; the small amount of distillate did not smell of sulphur chloride, and was not decomposed by water, showing that the product held most of the sulphur and chlorine in chemical combination. This was confirmed by the analysis, which showed 29.8% of sulphur and 24.4% of chlorine. The material gave off HCl on standing. It was a very dark red oil with a pronounced garlic odor and the sulphur corrosion test was unsatisfactory.

*Example XXIII.*—152 grams of the product of Example XXII were treated with a solution of 16 grams of 60% sodium monosulphide and 16 grams of sodium hydroxide in 80 c. c. of water, at 95° C., with stirring, for 3 hours. The organic layer was then separated, shaken with filter-aid, filtered, and vacuum dried. A final filtration gave 86 grams of a dark oil. It contained 34.4% of sulphur, and 13.55% of chlorine; the loss in weight through removal of chlorine is sufficient to account for the high sulphur content. This product did not give off HCl appreciably on standing, and the sulphur corrosion test was satisfactory.

It will be noted that this product contains much more chlorine than the product made from di-isobutylene. This fact is probably related to the fact that very little HCl is given off during the reactions with sulphur chloride and may indicate that for some structural reason the chlorine is more firmly held in the amylene molecule than in the di-isobutylene molecule. Nevertheless there appears to be no reason for thinking that there is any fundamental difference in the reactions of sulphur chloride with amylene and di-isobutylene, and this is borne out by the fact that the products are quite similar.

*Example XXIV.*—150 grams (2.14 mols) of technical amylene were placed in a flask, with a piece of iron wire dipping under the surface. The flask was provided with a sealed stirrer and an efficient reflux condenser. About 10 c. c. of sulphur monochloride were added, and the mixture was cooled to 35°, with stirring and active refluxing of the amylene. In a few minutes the reaction started, as shown by a moderate evolution of HCl, and the wire was withdrawn. Addition of sulphur chloride was continued over 1 hour, until 150 grams or 1.11 mols had been added, accompanied by a slow evolution of HCl. The reaction was exothermic, and the temperature was maintained at 30° C. by cooling. Stirring was continued at 30° C. for ½ hour after the addition of sulphur chloride was completed. The product at this point was a light reddish-yellow oil which fumed vigorously of HCl but had no odor of sulphur chloride.

*Example XXV.*—Four grams of the crude product of Example XXIV was left unstabilized. After a few days it had to a considerable extent decomposed, as shown by a notable darkening and formation of a tarry precipitate.

*Example XXVI.*—The remainder of the crude product of Example XXIV was stabilized without delay by stirring for 1 hour at 50°–60° C. with 300 c. c. of a 5% water solution of sodium carbonate. The aqueous layer was separated, and contained 2.4 grams of NaHCO₃ left from the original 15 grams of Na₂CO₃. The organic layer was shaken with 10 grams of filter-aid, filtered and vacuum dried at 95° C. The product was a red oil of low viscosity. It weighed 266 grams, and contained 26.0% of sulphur and 24.9% of chlorine. The sulphur test was satisfactory. Only traces of HCl were given off on standing, and although the color had darkened somewhat after 6 weeks there was no tarry precipitate nor other evidence of the decomposition suffered by the crude addition product after keeping only a few days.

*Example XXVII.*—To 100 grams (.3 mol) of technical tetracosylene (C₂₄H₄₈), were added 30 grams of sulphur monochloride (.22 mol) over a period of 40 minutes. At the beginning a piece of iron wire was held under the liquid to aid in starting the reaction. At 75°–80° C. a slight evolution of HCl began, and the wire was withdrawn. The reaction seemed to proceed slowly at 80° C. with very little heat change, and the mixture was held at this temperature for ¾ hour after all the sulphur chloride had been added. The product was a viscous red-brown oil which weighed 127.5 grams, showing a loss of only 2.5 grams as HCl evolved. It contained 11.45% of sulphur and 11.27% of chlorine. It fumed freely of HCl, and the sulphur test showed it to be much too corrosive for use in lubricants.

A portion of this product was heated to 100° C. under a good vacuum for 10 minutes. Nothing distilled into the receiver, and no odor of sulphur chloride could be detected. The sample lost 1.3% in weight and was temporarily rid of free HCl; however, after a few days standing it fumed freely as before. Eventually it became semi-crystalline.

*Example XXVIII.*—95 grams of the product of Example XXVII were diluted with 100 c. c. of toluene, and stirred at 85° C. for 1 hour with 50 c. c. of a liquor containing 8.9 grams of 60% sodium sulphide, 8.9 grams of NaOH and 44 c. c. of water. An emulsion was produced which was difficult to separate. The organic liquid layer was shaken with 10 grams of filter-aid, filtered and vacuum dried. The product was 84 grams of a dark red oil, which contained 11.42% of sulphur and 10.27% of chlorine. The sulphur test was satisfactory. The odor was mild and bland, and the material developed only small traces of free HCl after 6 weeks standing, but had become semi-crystalline.

It is to be noted that in this case most of the sulphur and chlorine introduced during the principal reaction remained in the product, even after stabilization. This is very interesting, as it shows that in the case of tetracosylene the product can be stabilized with very little change in chemical composition.

*Example XXIX.*—To 150 grams (1.84 mols) of cyclohexene (E. K. Co. No. 1043) were added about 5 c. c. of sulphur monochloride. The mixture was stirred and slowly heated to 85° C., with an iron wire dipping under the surface. At this point the reaction started, and the wire was withdrawn. The addition of sulphur monochloride was continued, cooling the flask to maintain the temperature between 80°-90° C., until 123 grams (.92 mols) had been added. This required 20 minutes. The reaction was moderately exothermic, but no noticeable amount of HCl was given off. The mixture was stirred for 5 minutes longer and then cooled.

The product was a reddish-brown liquid, which weighed 267 grams and contained 21.8% of sulphur and 23.6% of chlorine. It fumed badly of HCl, and was very corrosive by the sulphur test.

*Example XXX.*—224 grams of the product of Example XXIX were diluted with 50 c. c. of toluene, and stirred with 500 c. c. of a 5% sodium carbonate solution at 50° C. for 1 hour. At the end the solution was still strongly basic. The organic layer was separated, shaken with 5 grams of filter-aid, filtered, and vacuum dried. The product was a reddish oily liquid, and contained 21.7% of sulphur and 23.2% of chlorine. It weighed 206 grams. The sulphur test was satisfactory, and the material gave only traces of HCl upon standing.

In this case, as in the preceding, most of the sulphur and chlorine introduced in the principal reaction remained in the final product after stabilization.

Examples XXII to XXX show that:

(*l*) Amylene, cyclohexene and tetracosylene react with sulphur monochloride under conditions very similar to those under which di-isobutylene reacts with sulphur monochloride, except that, (*m*) instead of copious evolution of HCl, the evolution is almost negligible, showing that the chlorine is much more firmly held in some molecules than in others.

(*n*) These products can be stabilized with very little change in chemical composition, showing that the stabilization process is not a mere removal of HCl.

(*o*) Although tetracosylene takes up less sulphur and chlorine percent than the others, since its molecule is 3 to 4.8 times heavier than the others, its sulphur and chlorine content may actually be greater.

It is to be understood that di-isobutylene is not a chemical individual. In point of fact the products known as di-isobutylene sold by different refineries may vary considerably in composition and behavior. The term "di-isobutylene" should therefore be understood as referring to any of the commercial olefins of predominantly eight carbon atoms now sold under that designation.

At present, di-isobutylene is one of the most abundant and therefore cheapest of the liquid olefins. However I do not wish to be limited thereto as the other olefins discussed, besides still others of both the straight and branched chain and cyclic types, are at least potentially available and more or less similar in their behavior when reacted with sulphur chloride.

For present purpose, I prefer the monochloride to the dichloride, as the reaction with the dichloride is quite exothermic and a little difficult to control; also it tends to yield a product of lower sulphur and higher chlorine content, which proves upon test to be less stable. Nevertheless I do not wish to be limited to either the monochloride or dichloride as any sulphur chloride such as sulphur tetrachloride reacts with olefins in a more or less similar manner.

The upper limits of temperature given in the foregoing examples are in general imposed by the boiling points of the reactants and are temperatures at which the reagents begin to show a tendency to reflux. I do not wish to be limited to these exact temperatures as higher temperatures could obviously be used under pressure, and somewhat lower temperatures can also be employed.

Although I prefer to stabilize the product by means of sodium or calcium hydroxide, sodium carbonate or sodium monosulphide, on account of the cheapness and availability of these compounds, I do not wish to be limited thereto, as the corresponding potassium and ammonium compounds are likewise more or less suited to my purpose. Although I prefer to use these stabilizing agents in a water solution, because of the ease with which the aqueous phase may later be separated from the non-aqueous phase, I do not wish to be limited thereto, as my solvent for these agents which can be readily separated from the product, such as aqueous alcohol, is more or less suited to my purpose.

I claim as my invention:

1. The process for production of a relatively non-volatile, bland, stable, non-corrosive sulphur-containing composition, miscible with mineral lubricating oils, which comprises adding a chloride of sulphur to an olefin with agitation, at 30° to 100° C. and under non-polymerizing conditions, treating the resulting product with a solution of a compound having an alkaline reaction and which will form relatively stable compounds with sulphur and chlorine, in a solvent for said compound, separating said solvent and the by-products from the product and drying the product.

2. The process for production of a relatively non-volatile, bland, stable, non-corrosive sulphur-containing composition, miscible with mineral lubricating oils, which comprises adding a chloride of sulphur to an olefin with agitation, at 30° to 100° C. and under non-polymerizing conditions, treating the resulting product with an aqueous solution of a compound having an alkaline reaction and which will form relatively stable compounds with sulphur and chlorine, separating the phases and drying the non-aqueous phase.

3. The process for production of a relatively non-volatile, bland, stable, non-corrosive sulphur-containing composition, miscible with mineral lubricating oils, which comprises adding a chloride of sulphur to an olefin with agitation, at 30° to 100° C. and under non-polymerizing conditions, treating the resulting product with an aqueous solution of at least one compound of the group consisting of the alkali metal, alkaline earth and ammonium hydroxides, sulphides and polysulphides and alkali metal and ammonium carbonates, separating the phases and drying the non-aqueous phase.

4. The process for production of a relatively non-volatile, bland, stable, non-corrosive sulphur-containing composition, miscible with mineral lubricating oils, which comprises adding a chloride of sulphur to di-isobutylene with agitation, at 30° to 100° C. and under non-polymerizing conditions, treating the resulting product with an aqueous solution of a compound having an alkaline reaction and which will form relatively stable compounds with sulphur and chlorine, separating the phases and drying the non-aqueous phase.

5. The process for production of a relatively non-volatile, bland, stable, non-corrosive sulphur-containing composition, miscible with mineral lubricating oils, which comprises adding a chloride of sulphur to an olefin with agitation, at 30° to 100° C. in presence of iron for at least a part of the reaction and under non-polymerizing conditions, treating the resulting product with an aqueous solution of at least one compound of the group consisting of the alkali metal, alkaline earth and ammonium hydroxides, sulphides and polysulphides and alkali metal and ammonium carbonates, separating the phases and drying the non-aqueous phase.

6. The process for production of a relatively non-volatile, bland, stable, non-corrosive sulphur-containing composition, miscible with mineral lubricating oils which comprises heating an olefin in a non-metallic vessel, adding sulphur monochloride thereto, with agitation, in presence of iron until the reaction starts, withdrawing the iron, maintaining the temperature at 80° to 100° C. until the reaction is complete, treating the resulting product with an aqueous solution of a compound having an alkaline reaction and which will form relatively stable compounds with sulphur and chlorine, separating the phases and drying the non-aqueous phase.

7. The process for production of a relatively non-volatile, bland, stable, non-corrosive sulphur-containing composition, miscible with mineral lubricating oils, which comprises adding a chloride of sulphur to di-isobutylene with agitation, at atmospheric pressure and substantially 30° to 100° C., treating the resulting product with an aqueous solution of a compound having an alkaline reaction and which will form relatively stable compounds with sulphur and chlorine, separating the phases and drying the non-aqueous phase.

8. The process for production of a relatively non-volatile, bland, stable, non-corrosive sulphur-containing composition, miscible with mineral lubricating oils, which comprises adding sulphur monochloride to di-isobutylene with agitation, at atmospheric pressure and substantially 50° to 100° C., treating the resulting product with an aqueous solution of a compound having an alkaline reaction and which will form relatively stable compounds with sulphur and chlorine, separating the phases and drying the non-aqueous phase.

9. The process for production of a relatively non-volatile, bland, stable, non-corrosive sulphur-containing composition, miscible with mineral lubricating oils, which comprises adding sulphur monochloride to cyclohexene with agitation, at 80° to 90° C. and at atmospheric pressure and not over substantially 90° C., treating the resulting product with an aqueous solution of a compound having an alkaline reaction and which will form relatively stable compounds with sulphur and chlorine, separating the phases and drying the non-aqueous phase.

10. The process for production of a relatively non-volatile, bland, stable, non-corrosive sulphur-containing composition, miscible with mineral lubricating oils, which comprises adding sulphur monochloride to amylene with agitation, at 30° to 100° C., at atmospheric pressure and not over substantially 80° C., treating the resulting product with an aqueous solution of at least one compound of the group consisting of the alkali metal, alkaline earth and ammonium hydroxides, sulphides and polysulphides and alkali metal and ammonium carbonates, separating the phases and drying the non-aqueous phase.

11. The process for production of a relatively non-volatile, bland, stable, non-corrosive sulphur-containing composition, miscible with mineral lubricating oils, which comprises adding a chloride of sulphur to an olefin with agitation, at 30° to 100° C. and under non-polymerizing conditions, treating the resulting product with an aqueous solution of sodium hydroxide and sodium monosulphide, separating the phases and drying the non-aqueous phase.

12. The process for production of a relatively non-volatile, bland, stable, non-corrosive sulphur-containing composition, miscible with mineral lubricating oils, which comprises adding a chloride of sulphur to an olefin with agitation, at 30° to 100° C. and under non-polymerizing conditions, treating the resulting product with an aqueous suspension of lime in a solution of sodium monosulphide, separating the phases and filtering and drying the non-aqueous phase.

13. The process for production of a relatively non-volatile, bland, stable, non-corrosive sulphur-containing composition, miscible with mineral lubricating oils, which comprises adding a chloride of sulphur to an olefin with agitation, at 30° to 100° C. and under non-polymerizing conditions, treating the resulting batch of product with an aqueous solution of a compound having an alkaline reaction and which will form a relatively stable compound with sulphur or chlorine which solution has been previously used for finishing a previous similar batch, separating the phases, treating the non-aqueous phase with more of said solution freshly made up, separating the phases again and drying the product.

14. The process for production of a relatively non-volatile, bland, stable, non-corrosive sulphur containing composition, miscible with mineral lubricating oils, which comprises heating di-isobutylene to substantially 50° C., adding an equal weight of sulphur monochloride slowly with stirring, allowing the temperature to rise and holding it at 90° C. to 100° C. until the reaction is complete, treating the resulting product with an aqueous solution of a compound having an alkaline reaction and which will form relatively stable compounds with sulphur and chlorine, separating the phases and washing and drying the non-aqueous phase.

15. The process for production of a relatively non-volatile, stable, non-corrosive sulphur containing composition, miscible with mineral lubricating oils, which comprises gradually adding sulphur monochloride to a substantially equal weight of di-isobutylene in a non-metallic vessel, with stirring and heating, in presence of iron, withdrawing the iron as soon as the reaction is well under way, maintaining the reagents at substantially 80° to 100° C., treating the resulting product with a solution of substantially 64 grams of sodium hydroxide and 64 grams of 60% sodium monosulphide to 320 c. c. of water, separating the phases and washing and drying the non-aqueous phase.

16. The process for production of a relatively non-volatile, stable, non-corrosive sulphur containing composition miscible with mineral lubricating oils, which comprises gradually adding sulphur monochloride to a substantially equal weight of di-isobutylene in a non-metallic vessel, with stirring and heating, in presence of iron, withdrawing the iron as soon as the reaction is well under way, maintaining the reagents at substantially 80° to 100° C., treating the resulting batch of product with a solution originally made up of 64 grams of sodium hydroxide and 64 grams of 60% sodium monosulphide to 320 c. c. of water, which solution has been previously used for finishing a previous similar batch, separating the phases, treating the non-aqueous phase with fresh solution made up as stated, separating the phases again and drying the product without further washing.

17. The process for production of a relatively non-volatile, stable, non-corrosive sulphur containing composition, miscible with lubricating oils, which comprises slowly adding sulphur monochloride to cyclohexene, to the proportions of substantially 123 grams of sulphur monochloride to 150 grams of cyclohexene, with stirring, in presence of iron during at least a part of the addition, subjecting the mixture to a temperature of substantially 80° to 90° C. until the reaction is complete, diluting the product with a volatile hydrocarbon solvent, treating with a weak aqueous solution of sodium carbonate, separating the phases and clarifying and drying the non-aqueous phase.

18. The process for production of a relatively non-volatile, stable, non-corrosive sulphur containing composition, miscible with mineral lubricating oils, which comprises slowly adding to amylene a substantially equal weight of sulphur monochloride, in the presence of iron during at least a part of the addition, subjecting the mixture to substantially 30° to 35° C. until the reaction is complete, treating with a 5 per cent solution of sodium carbonate at 50° to 60° C., separating the phases and clarifying and drying the non-aqueous phase.

19. As a new composition of matter, a liquid, sulphur and chlorine containing, mineral oil miscible and relatively non-volatile, stable and non-corrosive reaction product of an olefin with a chloride of sulphur, stabilized by treatment with a compound having an alkaline reaction and which will form relatively stable compounds with sulphur and chlorine.

20. As a new composition of matter a liquid, sulphur and chlorine containing, mineral oil miscible and relatively non-volatile, stable and non-corrosive reaction product of an olefin with a chloride of sulphur, stabilized by treatment with at least one compound of the group consisting of the alkali metal, alkaline earth and ammonium hydroxides, sulphides and polysulphides and alkali metal and ammonium carbonates.

21. As a new composition of matter a liquid, sulphur and chlorine containing, mineral oil miscible and relatively non-volatile, stable and non-corrosive reaction product of di-isobutylene with a chloride of sulphur stabilized by treatment with a compound having an alkaline reaction and which will form relatively stable compounds with sulphur and chlorine.

22. As a new composition of matter a liquid, mineral oil miscible and relatively non-volatile, stable and non-corrosive reaction product of di-isobutylene with sulphur monochloride stabilized by treatment with a compound having an alkaline reaction and which will form relatively stable compounds with sulphur and chlorine, said product containing 23.6 to 34.9 percent of sulphur and 1.6 to 6.2 percent of chlorine.

23. As a new composition of matter a liquid, sulphur and chlorine containing, mineral oil miscible and relatively non-volatile, stable and non-corrosive reaction product of cyclohexene with a sulphur chloride, stabilized by treatment with a compound having an alkaline reaction and which will form relatively stable compounds with sulphur and chlorine.

24. As a new composition of matter a liquid, mineral oil miscible, relatively non-volatile, stable and non-corrosive reaction product of cyclohexene with sulphur monochloride stabilized by treatment with a compound having an alkaline reaction and which will form relatively stable compounds with sulphur and chlorine, said product containing substantially 21.7 to 21.8 percent sulphur and 23.2 to 23.6 percent chlorine.

25. As a new composition of matter a sulphur and chlorine containing, mineral oil soluble and relatively non-volatile, stable and non-corrosive reaction product of amylene with a sulphur chloride, stabilized by treatment with a compound having an alkaline reaction and which will form relatively stable compounds with sulphur and chlorine.

26. As a new composition of matter a sulphur and chlorine containing, mineral oil soluble and relatively non-volatile, stable and non-corrosive reaction product of amylene with sulphur monochloride, stabilized by treatment with a compound having an alkaline reaction and which will form relatively stable compounds with sulphur and chlorine, said product containing substantially 26 to 34½ percent sulphur and 13½ to 25 percent chlorine.

RICHARD H. KIMBALL.